(No Model.)

J. M. MUNN.
FISH HOOK.

No. 450,317. Patented Apr. 14, 1891.

Witnesses:
Frank S. Blanchard
Charles Shewry

Inventor:
James M. Munn
by Bond, Adams & Jones
attys.

UNITED STATES PATENT OFFICE.

JAMES M. MUNN, OF CHICAGO, ILLINOIS.

FISH-HOOK.

SPECIFICATION forming part of Letters Patent No. 450,317, dated April 14, 1891.

Application filed August 5, 1890. Serial No. 361,136. (No model.)

*To all whom it may concern:*

Be it known that I, JAMES M. MUNN, of Chicago, in the county of Cook and State of Illinois, and a citizen of the United States, have invented a new and useful Improvement in Fish-Hooks, of which the following is a specification, reference being had to the accompanying drawings, in which—

Figure 1:
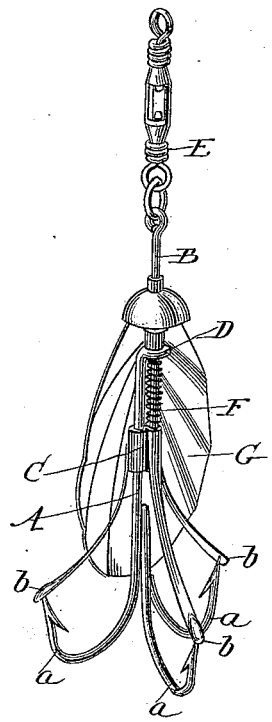
Figure 2:
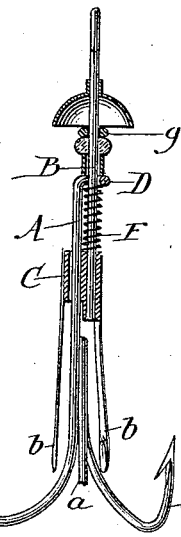

Figure 1 is a perspective view showing the hook ready for use, and Fig. 2 is a vertical section showing the method of uniting the two parts of the hook.

My invention relates to fish-hooks adapted to be used for trolling, and is especially adapted for use in waters containing weeds and similar substances likely to become fastened on the hook and so make it inoperative.

The object of my invention is to provide a guard for the hooks which will prevent them from becoming entangled in weeds and similar substances, but which will in no way interfere with the utility of the hooks for catching fish. I accomplish this object as illustrated in the drawings, and as hereinafter described.

That which I claim as new will be pointed out in the claims.

In the drawings, A represents the shank of hooks $a$, which are firmly united at the base in any suitable manner. The shank A passes through a ring or boss C on a rod B and terminates at its upper end in a ring D, bent at right angles to the shank A. The shank A slides through the ring or boss C, and the ring D slides freely upon the rod B, which is connected with the trolling-line, as shown at E in Fig. 1.

The rod B is cylindrical in form and extends along the shank A for about half the length of the shank. Upon the lower end of the rod B is firmly fixed the ring or boss C, which projects sufficiently to one side to allow the shank to move easily along the side of the rod B. Upon the lower end of the rod B and boss C are secured guards $b$, one for each hook $a$, which guards are made of spring metal and are so placed and of such length that their ends may rest upon the points of the hooks $a$. The ends of the guards $b$ are formed slightly concave on the under side, so that they will more easily retain their position on the points of the hooks and when released lie close to the shank A, as shown in Fig. 2.

The shank A is held by means of a spring F in such position that the ends of the guards $b$ will rest upon the points of the hooks $a$.

G represents an ordinary spoon-bait, which is attached to the rod B by means of a ring $g$ at its upper end, which ring $g$ slides easily upon the rod B and is adapted to press against the ring D on the upper end of the shank A when the spoon-bait is drawn downward. The shank of the hooks is preferably made of such length that the lower end of the spoon-bait will extend nearly to the points of the hooks.

In operation the guards $b$ are lifted and their ends placed upon the points of their respective hooks $a$, where they are held by their own elasticity, the spring F being of sufficient strength to prevent the hooks from being pressed downward by the guards $b$ and by weeds or grass. When the bait is seized by a fish, the spoon-bait is drawn downward, thereby drawing the shank A downward and releasing the guards $b$ and exposing the points of the hooks $a$, upon which the fish is then caught.

Any desired number of hooks may be used, a corresponding guard being provided for each hook.

What I claim as new, and desire to secure by Letters Patent, is—

1. In a fish-hook, the combination of a hook and spring-guard for the point thereof with a spoon-bait adapted to be moved longitudinally to disengage the guard from the hook, substantially as and for the purpose specified.

2. In a fish-hook, the combination of a hook, a spring-guard for the point thereof, and a spring normally exerting an upward pressure on the hook-shank with a spoon-bait adapted to be moved longitudinally to disengage the guard from the hook, substantially as and for the purpose specified.

3. In a fish-hook, the combination of a rod B, spring F, and spring-guard for the point of the hook with a hook adapted to be moved longitudinally on the rod B, substantially as and for the purpose specified.

4. In a fish-hook, the combination of a rod B, a spoon-bait having a ring which encircles the rod B, a boss C, a guard connected with the lower end of the rod B, and a spring F on said rod with a hook having a shank which passes through said boss and is provided with a ring D, which encircles the rod B above the spring F, substantially as and for the purpose specified.

JAMES M. MUNN.

Witnesses:
JOHN L. JACKSON,
HARRY T. JONES.